United States Patent
Kang et al.

(10) Patent No.: US 6,812,606 B2
(45) Date of Patent: Nov. 2, 2004

(54) RECIPROCATING MOTOR

(75) Inventors: Kyung-Seok Kang, Ginhae (KR);
Gyoo-Jong Bae, Changwon (KR);
Kyung Bum Hur, Seoul (KR);
Jong-Tae Heo, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/958,889

(22) PCT Filed: Feb. 17, 2001

(86) PCT No.: PCT/KR01/00243
§ 371 (c)(1),
(2), (4) Date: Oct. 17, 2001

(87) PCT Pub. No.: WO01/61831
PCT Pub. Date: Aug. 23, 2001

(65) Prior Publication Data
US 2002/0153782 A1 Oct. 24, 2002

(30) Foreign Application Priority Data
Feb. 17, 2000 (KR) .......................................... 2000-7552

(51) Int. Cl.$^7$ ............................................. H02K 13/00
(52) U.S. Cl. ......................................... 310/71; 310/194
(58) Field of Search ............................ 310/45, 51, 71, 310/194, 216–218, 254, 258, 259

(56) References Cited

U.S. PATENT DOCUMENTS

| | | | | |
|---|---|---|---|---|
| 3,716,733 A | * | 2/1973 | Keith et al. .................. | 310/71 |
| 3,902,087 A | * | 8/1975 | Hakamada et al. ......... | 310/211 |
| 4,169,234 A | * | 9/1979 | Yonkers ....................... | 310/29 |
| 5,844,332 A | * | 12/1998 | Lee ............................. | 310/12 |
| 6,181,038 B1 | * | 1/2001 | Van Rooij .................... | 310/89 |
| 6,265,802 B1 | * | 7/2001 | Getschmann ............... | 310/216 |
| 6,315,168 B1 | * | 11/2001 | Bolyard et al. ........ | 222/189.06 |

FOREIGN PATENT DOCUMENTS

| | | | |
|---|---|---|---|
| JP | 2000-166189 | | 6/2000 |
| JP | 02001037114 A | * | 2/2001 |
| WO | WO 00/62406 | | 10/2000 |

* cited by examiner

Primary Examiner—Burton S. Mullins
Assistant Examiner—Judson H. Jones
(74) Attorney, Agent, or Firm—Birch, Stewart, Kolasch & Birch, LLP

(57) ABSTRACT

A reciprocating motor for a reciprocating type compressor includes a bobbin having a coil wound inside thereof, a terminal formed at one side of the bobbin, for electrically connecting the coil and an external circuit, a core part at which a plurality of lamination sheets are radially stacked in a circumferential direction centering around the bobbin, and a fixing part for fixing at least one lamination sheet at the inner side of the core part. With this construction, the lamination sheets making the core part is prevented from vibrating and the collision between the lamination sheets and the terminal is prevented, so that when the motor operates, its noise is reduced and reliability of the operation of the motor is heightened.

4 Claims, 12 Drawing Sheets

RECIPROCATING MOTOR

This application is the national phase under 35 U.S.C. §371 of PCT International Application No. PCT/KR01/00243 which has an International filing date of Feb. 17, 2001, which designated the United States of America and was published in English.

TECHNICAL FIELD

The present invention relates a reciprocating motor for use in a reciprocating compressor, and more particularly, to a reciprocating motor in which an armature (a moving element) positioned between stators undergoes a linear reciprocating movement.

BACKGROUND ART

In general, a reciprocating motor is an apparatus for generating a driving force as an armature undergoes a linear reciprocating movement by a flux formed around a winding coil when a current is applied to the winding coil at the side of the stators.

FIG. 1 is a side view of a reciprocating motor in accordance with a conventional art, and FIG. 2 is a sectional view in the direction of A—A line of FIG. 1.

The reciprocating motor roughly includes stators 10 forming a flux when a current is applied thereto from an external source, and an armature 15 positioned in the stators 10, undergoing a linear reciprocating movement by virtue of the flux generated around the stators.

The stators 10 includes a cylindrical outer core 20, an inner core 25 positioned inside the outer core and a winding coil 30 installed at an inner side of the outer core 20 or the inner core 25, to which a current is applied from an external source.

The outer core 20 is formed cylindrical as a plurality of lamination sheets 21 are radially stacked, and the inner core 25 is formed also cylindrical as a plurality of lamination sheets 26 are radially stacked.

The lamination sheets 21 are mutually fixed by a fixing ring 23 connected to the side thereof.

The winding coil 30 is installed at one of the outer core 20 and the inner core 25 and constructed such that a coil is wound within a bobbin 35 made of an insulation material so as to be insulated with the outer core 20 or the inner core 25 where the flux is formed.

The bobbin 35 is formed in a hollow ring shape and includes a winding part 36 in which the coil is wound and a terminal part 37 protruded from one side of the winding part 36 and press-ft with a wire so that the winding coil 30 can be connected to an external power source.

A connector 38 is provided at the end of the terminal part 37 so as to be easily connected to the external power source.

The armature 15 includes a cylindrical movable cylinder 16 inserted between the outer core 20 and the inner core 25 and linearly moved to transmit a driving force and a plurality of permanent magnets 18 mounted at the moving cylinder 16, for generating a mutual interaction force with a flux generated when a current is applied to the winding coil 30.

In the reciprocating motor constructed as described above, when a current is applied to the winding coil 30, a flux is formed around the winding coil 30, which flows forming a closed loop along the outer core 20 and the inner core 25.

At this time, as a mutual interaction force is generated between the flux flowing to the outer core 20 and the inner core 25 and the magnetic flux formed by the permanent magnet 18, the armature 15 including the permanent magnet receives a force in the axial direction, and undergoes a linear movement.

Accordingly, in the reciprocating motor, when the direction of the current applied to the winding coil 30 is changed in turn, the armature 15 continuously undergoes a linear movement between the stators 10 and generates a reciprocating movement force.

FIG. 3 is a schematic view showing an assembly structure that lamination sheets are stacked centering around a bobbin, and FIG. 4 is an enlarged view of a portion 'B' of FIG. 1 showing how the lamination sheets and the terminal part contact each other.

With reference to FIG. 3, the lamination sheets 21 of the outer core 20 are successively stacked around the winding part 36 of the bobbin 35.

Especially, the lamination sheets 21 is formed in an 'L' shape with the side portion 21a and the upper portion 21b integrally formed. The lamination sheets 21 and 21' are stacked in turn at the left side and the right side to make a cylindrical structure.

Accordingly, as shown in FIG. 4, though the outer diameter side 'H' of the outer core 20 is fixed through a fixing ring 23 in a state that the outer peripheral portions 221b of the lamination sheets 21 mutually contact closely, there is a gap between the lamination sheets 21 at the inner diameter side (I) of the core.

The terminal part 37 of the bobbin 35 is formed in a fan shape such that it is gradually widened as it goes from the inner diameter side of the outer core to the outer diameter side so that the laminations sheets 21 can be densely stacked in a cylindrical form.

In the outer core 20 formed as the lamination sheets 21 are stacked centering around the bobbin 35, when a current is applied to the winding coil 30 and a flux is formed, electromagnetic force is generated between the lamination sheets 21, so that the lamination sheets 21 at the side of the inner diameter (I) are vibrated.

At this time, since a mutual repulsive pulse is generated between the mutually adjacent lamination sheets 21 in terms of the magnetic circuit structure, the lamination sheets 21 do not collide with each other.

However, in case of the lamination sheet 21 adjacent to the terminal part 37 of the bobbin 35, since the lamination sheet 21" collides with the terminal part 37 while being vibrated, a collision noise is generated from the portion 'K' of FIG. 4, and in the worst case, it deteriorates a durability so that an operational efficiency of the motor is degraded or causes an occurrence of breakdown.

DETAILED DESCRIPTION OF THE INVENTION

Therefore, an object of the present invention is to provide a reciprocating motor which is capable of preventing a lamination sheet from vibrating during operation of a motor so that interference between elements such as the lamination sheet and a terminal is prevented to reduce a collision noise and damage to components and heighten a reliability in operation of the motor.

In order to achieve the above objects, there is provided a reciprocating motor including: a bobbin in which a coil is wound; a terminal part formed at one side of the bobbin to electrically connect the coil and an external circuit; a core part at which a plurality of lamination sheets are radially stacked in the circumferential direction centering around the bobbin; and a fixing part for fixing at least one of lamination sheets at the side of the core part.

MODE FOR CARRYING OUT THE PREFERRED EMBODIMENTS

The present invention will now be described with reference to accompanying drawings.

Figure 1:
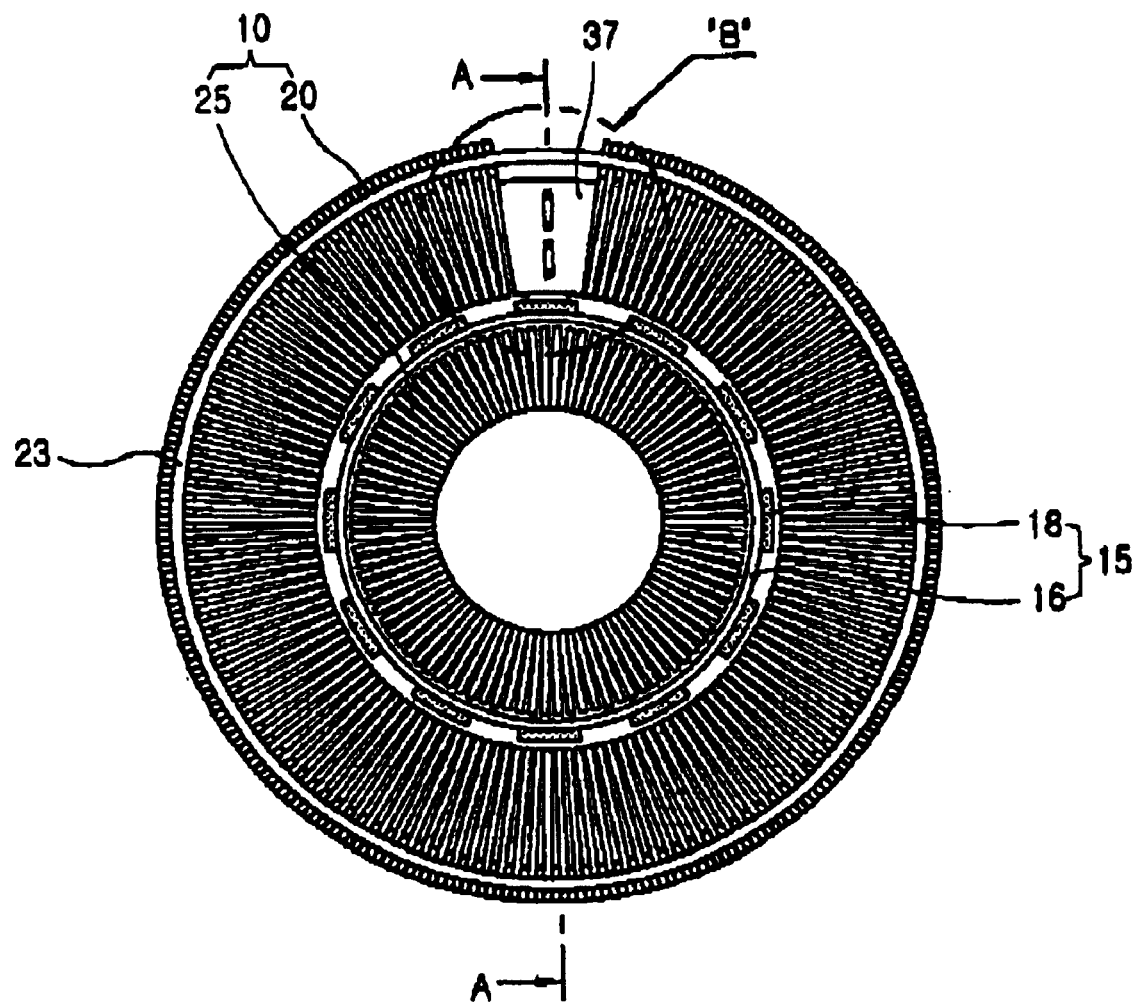
FIG. 1 is a side view of a reciprocating motor in accordance with a conventional art.
Figure 2:
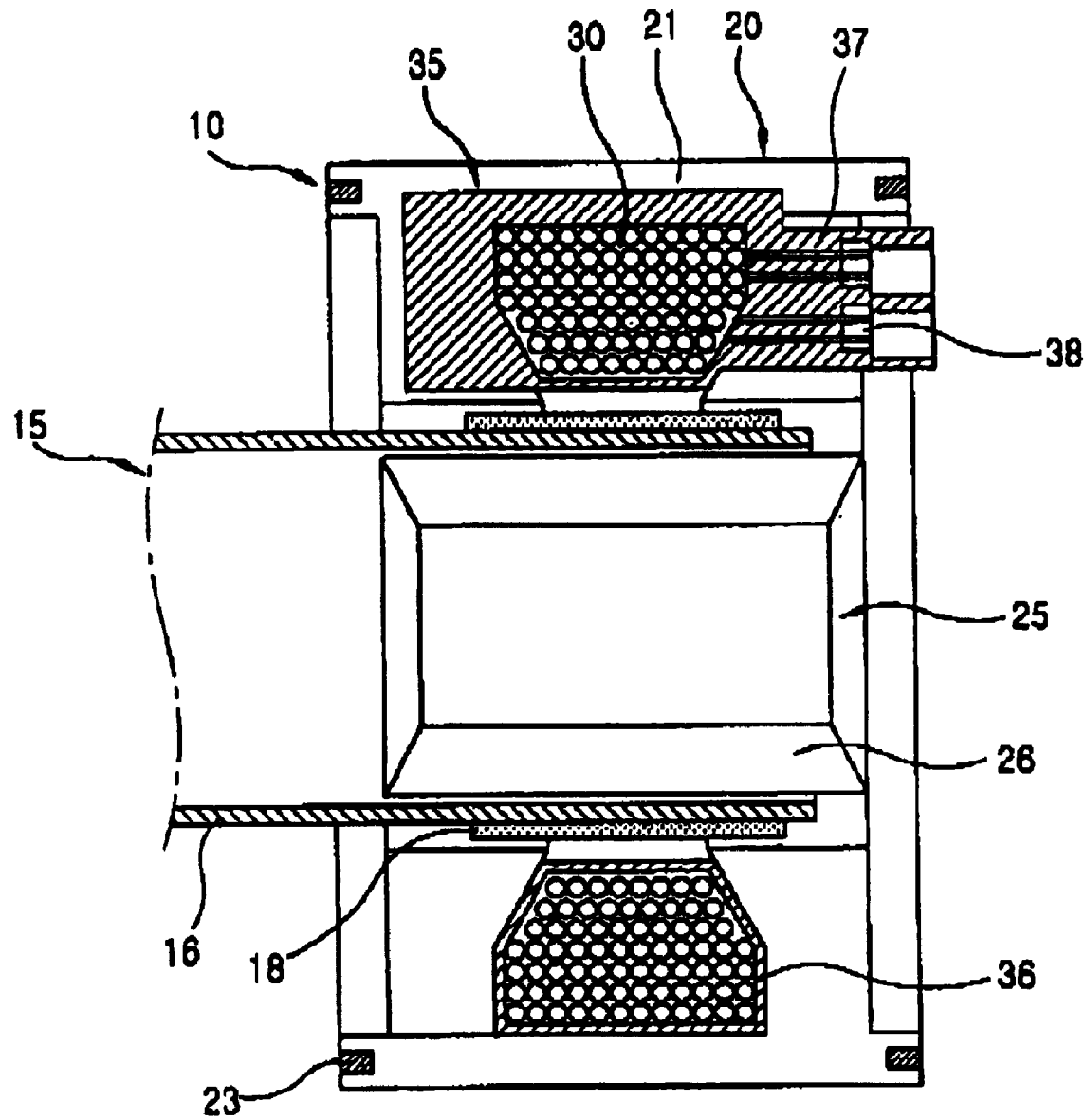
FIG. 2 is a sectional view taken along link 'A—A' of FIG. 1 in accordance with the conventional art.
Figure 3:
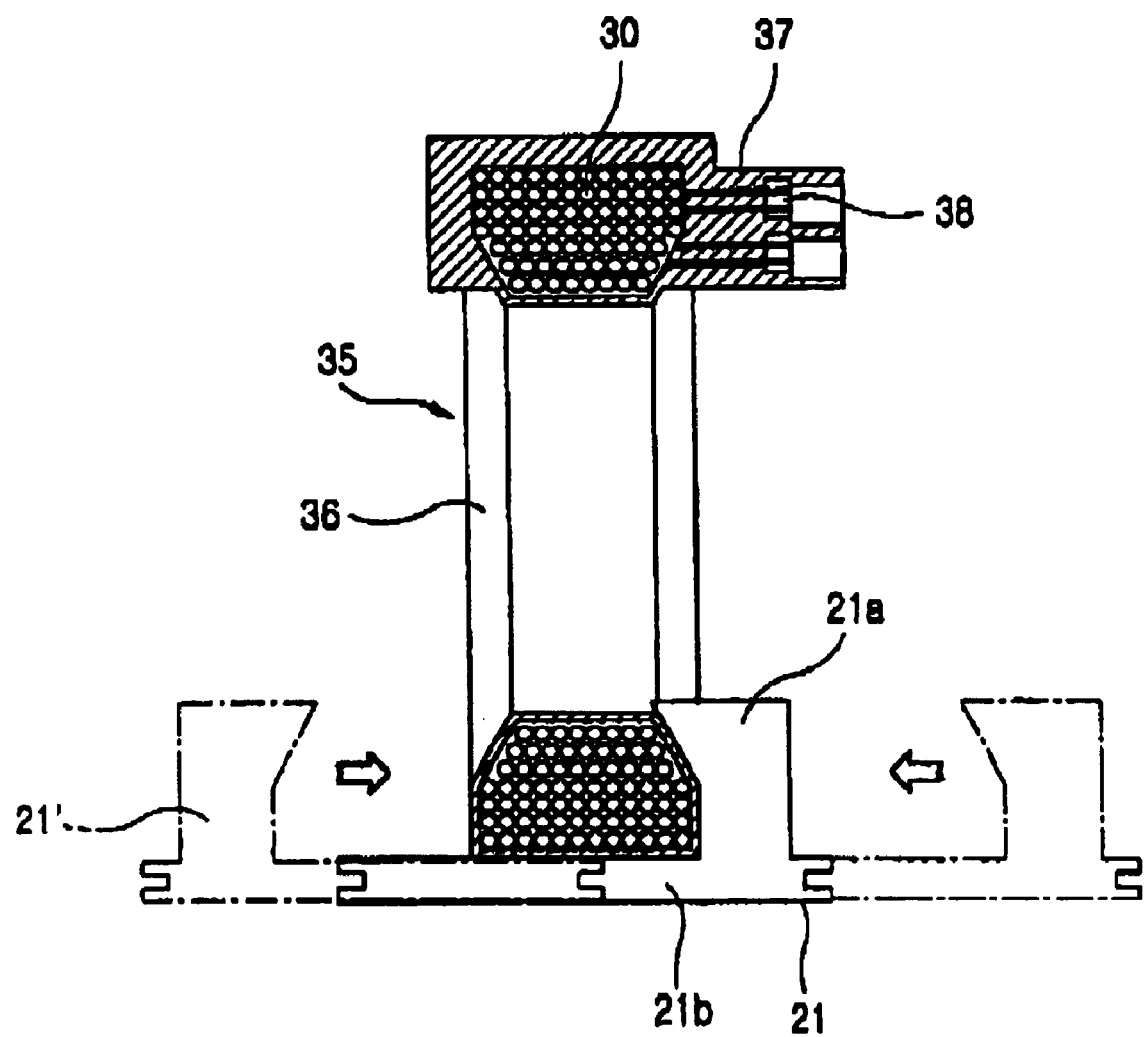
FIG. 3 illustrates a assembly structure of lamination sheets of the reciprocating motor in accordance with the conventional art.
Figure 4:
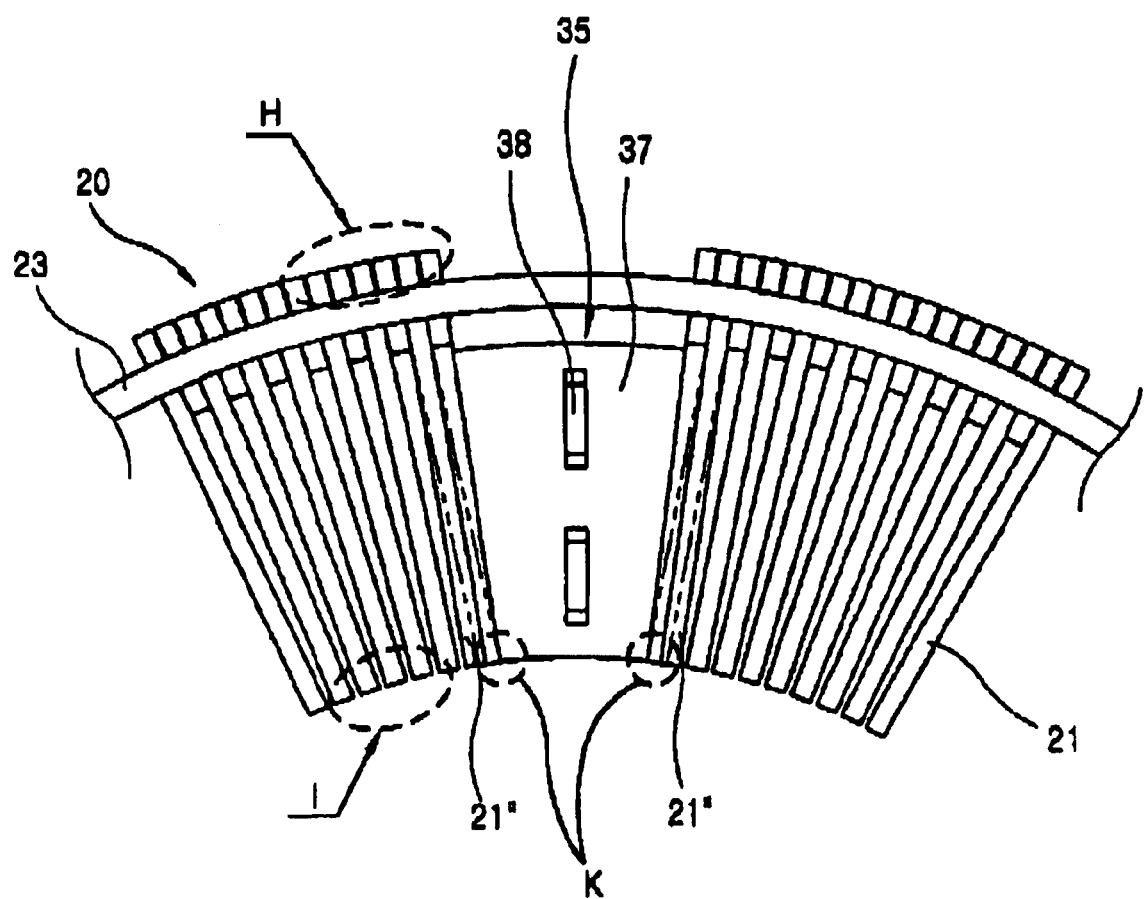
FIG. 4 is an enlarged view of a portion 'B' of FIG. 1, showing how the lamination sheets and the terminal part contact each other in accordance with the conventional art.
Figure 5:
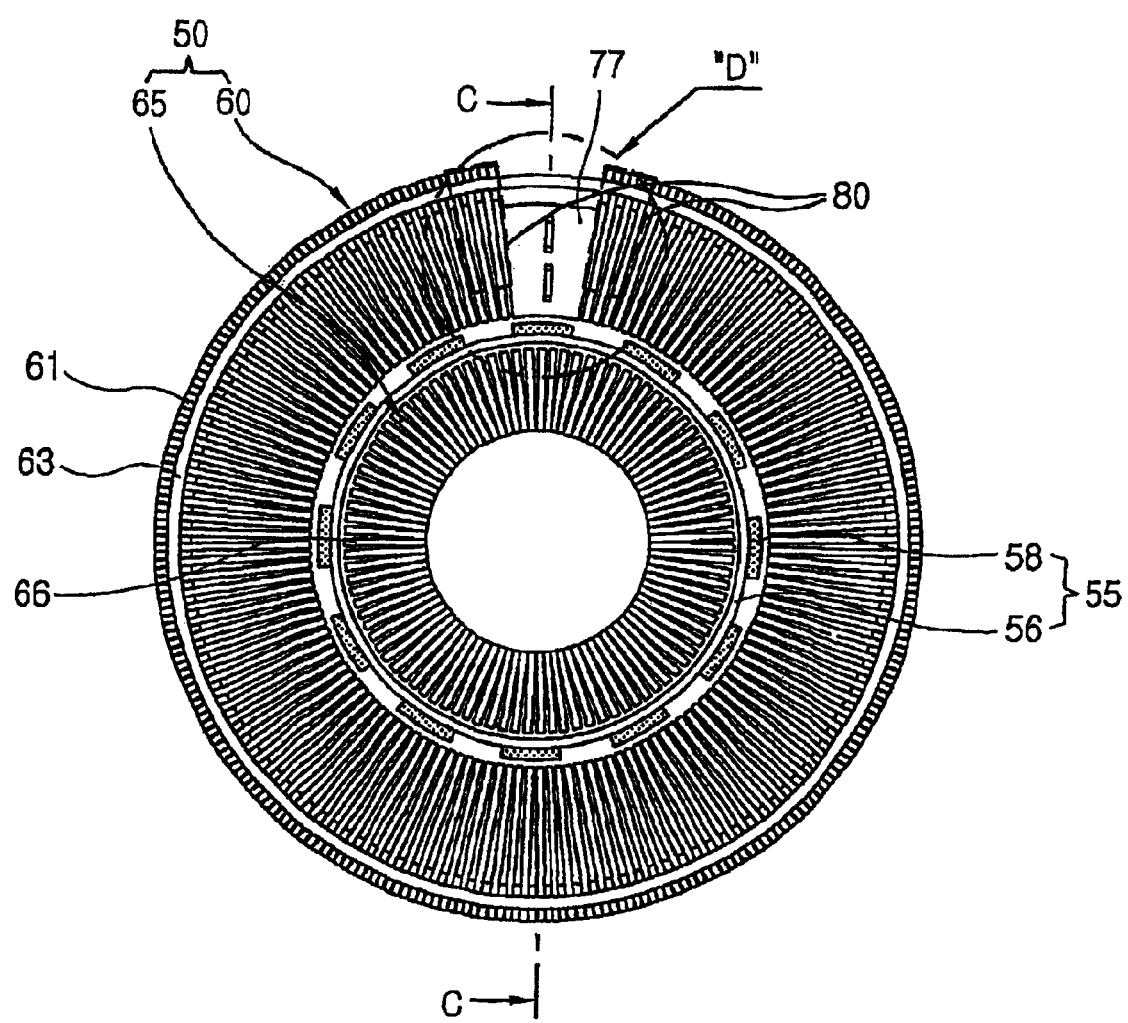
FIG. 5 is a side view of a reciprocating motor in accordance with a first embodiment of the present invention.
Figure 6:
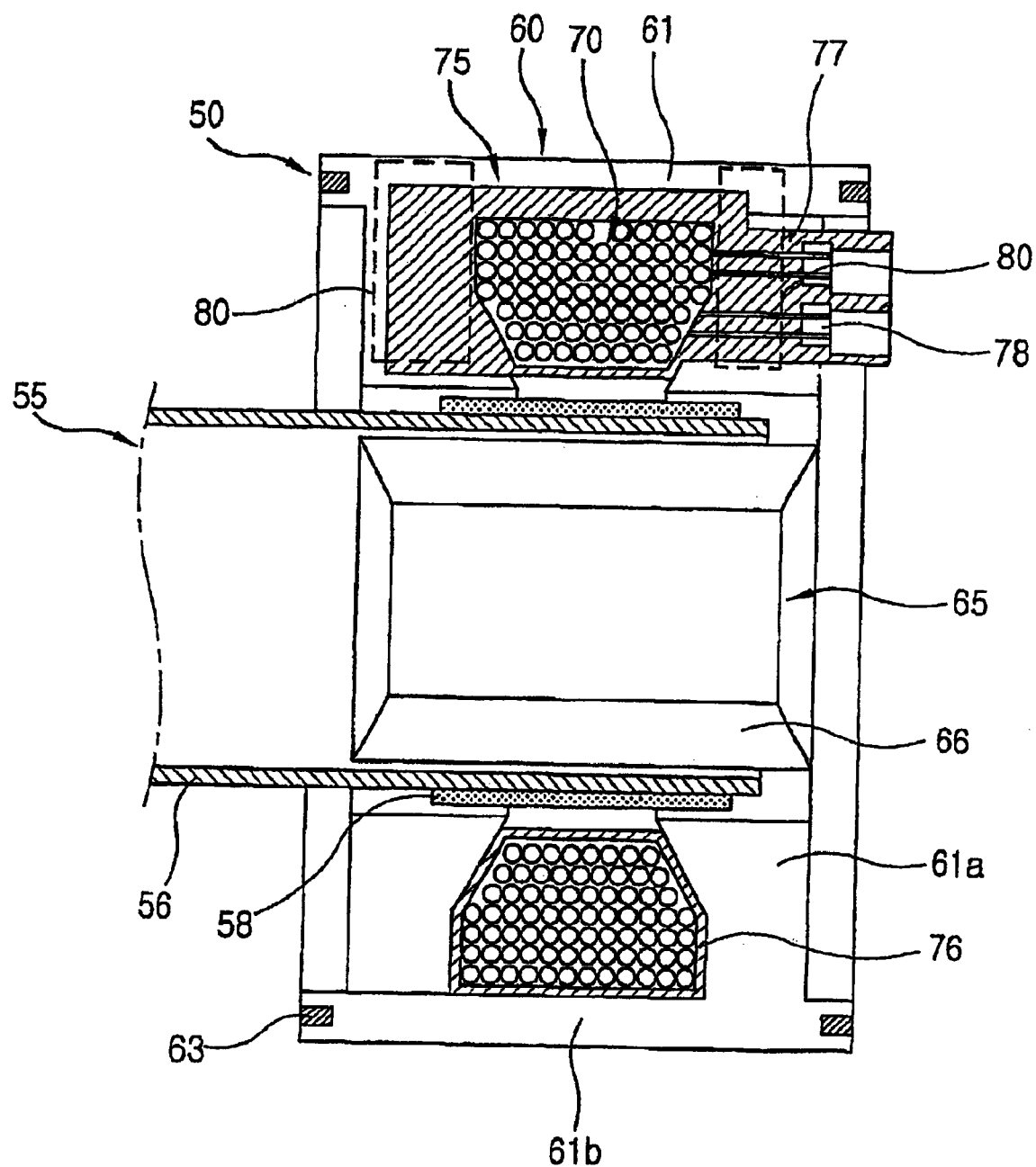
FIG. 6 is a sectional view taken along line 'C—C' of FIG. 5 in accordance with the first embodiment of the present invention.
Figure 7:
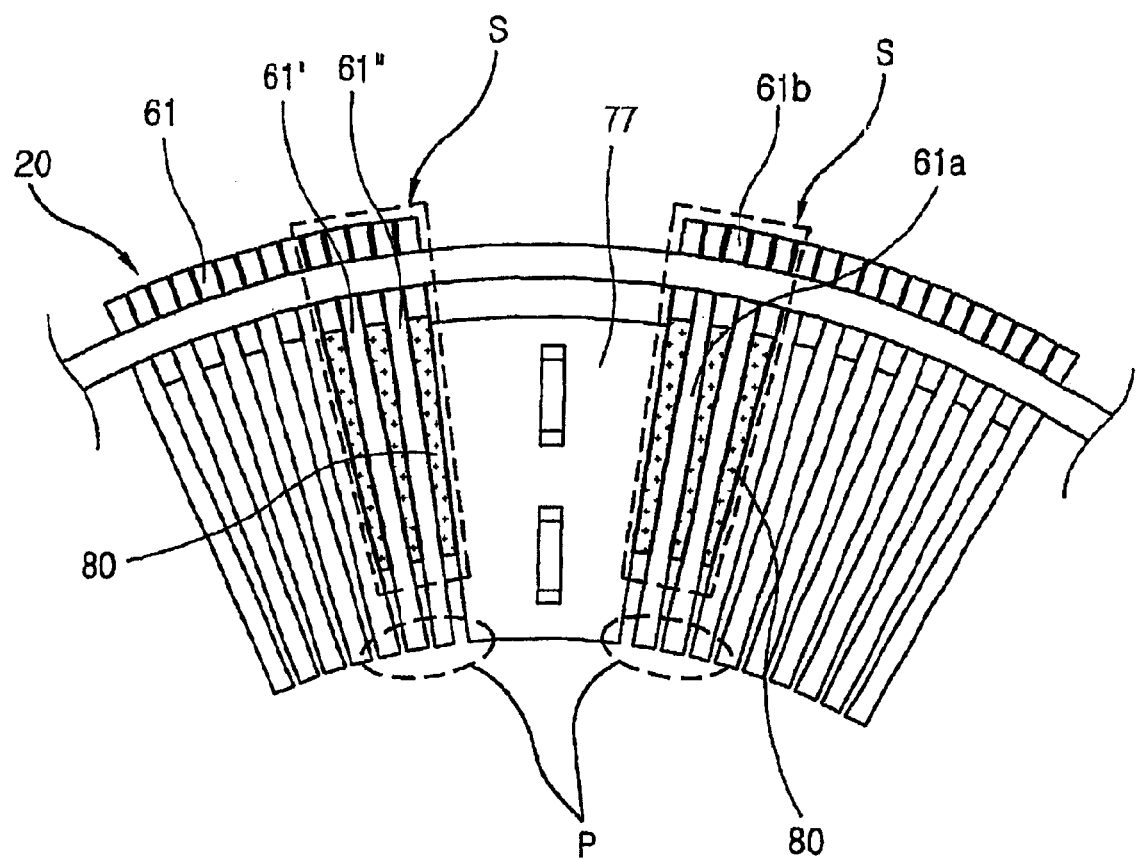
FIG. 7 is an enlarged view of a portion 'D' of FIG. 5, a major part in accordance with the first embodiment of the present invention.

FIG. 5 is a side view of a reciprocating motor in accordance with a first embodiment of the present invention, FIG. 6 is a sectional view taken along line 'C—C' of FIG. 5 in accordance with the first embodiment of the present invention and FIG. 7 is an enlarged view of a portion 'D' of FIG. 5, a major part in accordance with the first embodiment of the present invention.

A reciprocating motor in accordance with the first embodiment of the present invention includes stators 50 and an armature 55 which undergoes a reciprocating movement according to interaction of a magnetic flux within the stators 50.

The stators 50 includes a cylindrical outer core 60 and a cylindrical inner core 65 positioned inside the outer core 60, and a winding coil 70 is installed inside the outer core 60, to which a current is applied from an external source.

The armature 55 includes a moving cylinder 56 inserted between the outer core 60 and the inner core 65 and moved linearly to transmit a driving force, and a plurality of permanent magnets 58 mounted at the moving cylinder 56 and generating a mutual interaction force with a flux generated when a current is applied to the winding coil 70.

The outer core 60 and the inner core 65 are formed cylindrical as a plurality of lamination sheets 61 and 66 are radially stacked, and the stacked lamination sheets 61 are mutually fixed by a fixing ring 63.

The winding coil 70 is wound in a bobbin 75 made of an insulation material so as to be electrically insulated with the outer core.

The bobbin 75 includes a hallow annular winding part 76 in which a coil is wound, and a terminal part 77 having a connector 78 protruded at one side of the winding part 76, to which a wire is connected so that the winding coil 70 and an external source can be connected, and connected to an external power source.

The terminal part 77 of the bobbin 75 is formed fan-shaped such that it is widened as it goes toward the outer diameter so that the lamination sheets 61 can be densely stacked in the circumferential direction.

The lamination sheet 61 is formed in an 'L' shape such that the side portion 61a and the upper portion 61b are integrally formed.

Accordingly, the outer core 60 is formed cylindrical as the plurality of lamination sheets 61 are alternately stacked at the left side and the right side from one side to the opposite side of the terminal part 77 of the bobbin.

In this respect, as shown in FIG. 7, a bonding member 80 is filled between the lamination sheet 61' adjacent to the terminal part 77 and the terminal part 77 and between the lamination sheet 61' and the lamination sheet 61" so that mutually adjacent portions can be fixed each other.

In FIG. 7, 'S' indicates a portion glued by using the bonding member 80.

The bonding member 80 is filled at the inner diameter portion, that is, at the side portion 61a and the upper portion 61b except the pole portion (P) of the lamination sheet 61, to mutually fix the lamination sheets 61' and 61" as well as the lamination sheet 61' and the terminal part 77.

Not limited to the portion adjacent to the terminal part 77, the bonding member 80 may be filled all over the outer core 60 in the circumferential direction to mutually fix the lamination sheets 61. Or, the bonding member 80 may be filled only between the terminal part 77 and the lamination sheets 61 adjacent to the terminal part 77 to fix only the lamination sheet 61' adjacent to the terminal part 77.

In the reciprocating motor in accordance with the first embodiment of the present invention, when a current is applied to the winding coil 70, a flux is formed around the winding coil 70, and the flux flows forming a closed loop along the outer core 60 and the inner core 65.

At this time, as an electromagnetic force is generated between the lamination sheet 61 of the outer core 60, each lamination sheet 61 would be vibrated, but, as shown in FIG. 7, since the lamination sheet 61' and the lamination sheet 61" and the terminal part 77 and the lamination 61' are mutually fixed by the bonding-member 80, no collision between the adjacent members occurs.

Of course, in case of the mutually adjacent lamination sheets 61 which are not fixed by the bonding member 80, since mutual repulsive force is generated between them in terms of the magnetic circuit structure, they do not collide with each other.

In a state that no collision occurs between the lamination sheets 61' and 61" of the outer core 60 and between the lamination sheet 61' and the terminal part 77, a mutual interaction force is generated between the flux flowing at the outer core and the inner core 65 and a magnetic flux formed by the permanent magnet 58, so that the armature 55 including the permanent magnet 58 receives a force in the axial direction and undergoes a linear movement.

Accordingly, in the reciprocating motor, when the direction of the current applied to the winding coil 70 is alternately changed, the armature 55 undergoes a linear movement successively between the stators 50, generating a reciprocal movement force, and at this time, since no collision occurs between the lamination sheet 61 and the terminal part 77, a noise possibly generated during the operation of the motor can be reduced as much.

Figure 8:
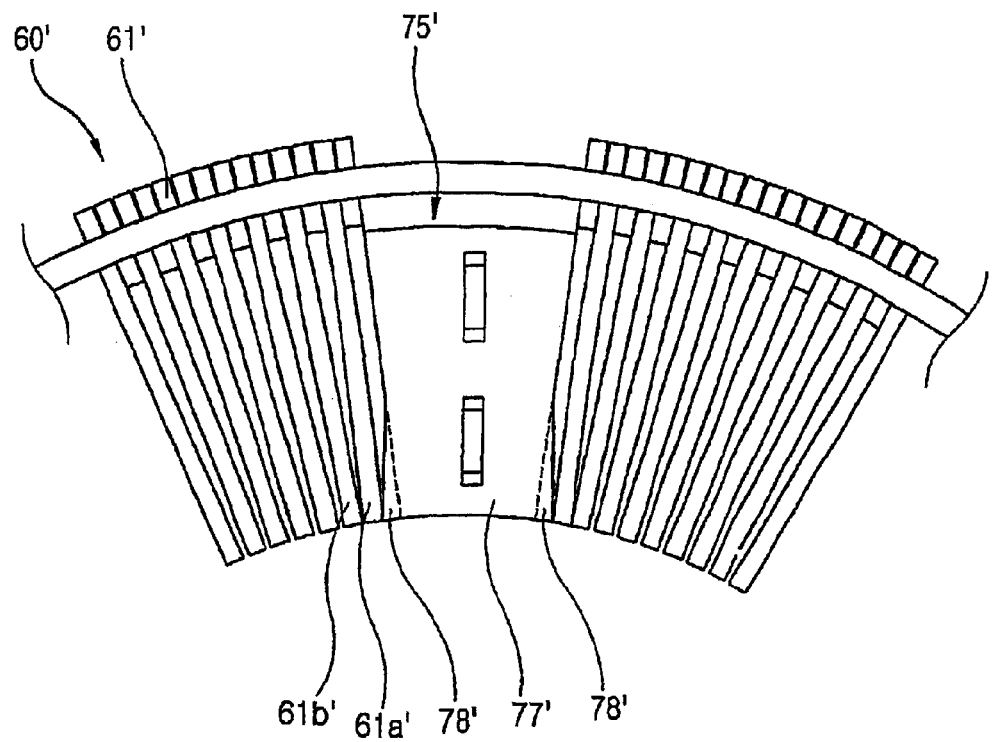
FIG. 8 is a detailed view of a major part of a reciprocating motor in accordance with a second embodiment of the present invention.

FIG. 8 is a detailed view of a major part of a reciprocating motor in accordance with a second embodiment of the present invention.

A reciprocating motor in accordance with a second embodiment of the present invention is featured in that a structure of a bobbin 75' is modified to prevent a collision between a terminal part 77' and a lamination sheet 61'.

That is, the terminal 77' of the bobbin 75' is formed fan-shaped so as for the lamination sheets 61' to be stacked densely in a cylindrical form. A fixing part 78' is protruded so that the terminal part 77' can be continuously adhered to a lamination sheet 61a' adjacent to the both sides of the outer core 60' at the side of the inner diameter.

The fixing part 78' is gradually protruded in the lamination sheet 61a' direction as it goes from the center of the side face of the terminal 77' to the inner diameter of the core and formed to be adhered to the side of the lamination sheet 61'.

It is preferred that the protrusion of the fixing part 78' is as high as that the lamination sheet 61a' where the fixing part is adhered is contactable to an adjacent lamination sheet 61b'.

Though the fixing part 78' is formed wholly protruded at the side of the terminal 77', it may be formed that a part thereof is protruded at the side of the terminal part 77' according to a designing condition.

As aforementioned, in the reciprocating motor in accordance with the second embodiment of the present invention, since the terminal part 77' and the lamination sheet 61a' adjacent to the terminal part 77' are mutually adhered by the fixing part 78', the lamination sheet 61a' adjacent to the terminal part 77' will not move during an operation of the motor, so that collision with the terminal part 77' would not occur.

Figure 9:
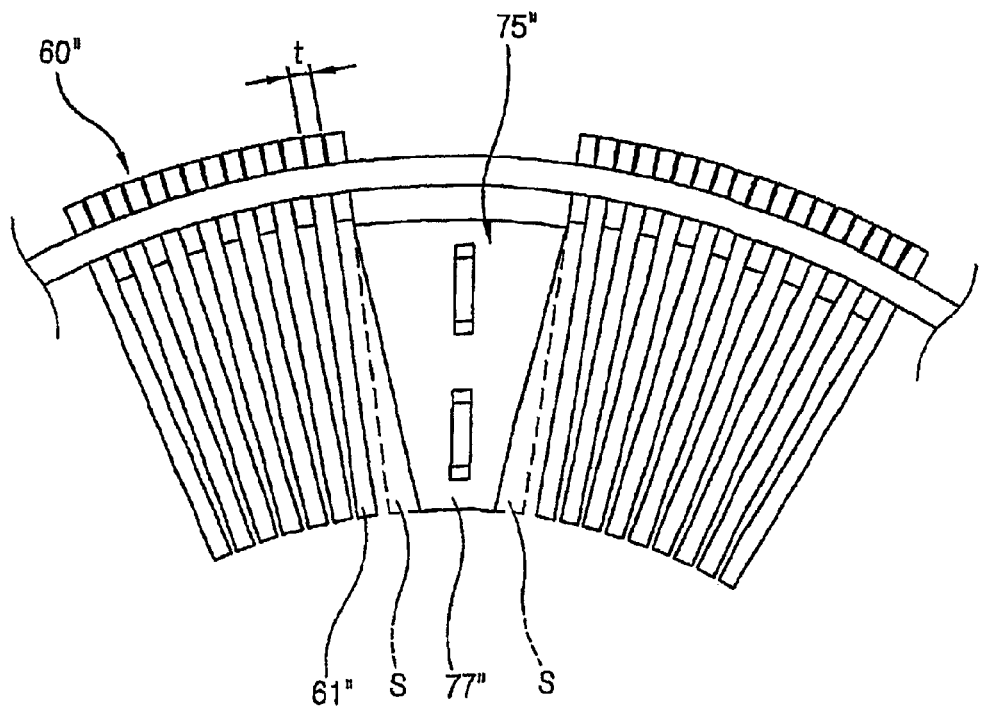
FIG. 9 is a detailed view of a major part of a reciprocating motor in accordance with a third embodiment of the present invention.

FIG. 9 is a detailed view of a major part of a reciprocating motor in accordance with a third embodiment of the present invention.

A reciprocating motor in accordance with the third embodiment of the present invention is featured in that a structure of a bobbin 75" is modified to prevent a collision between the terminal part 77" and the lamination sheet 61".

That is, the terminal part 77" of the bobbin 75" is formed in a shape (S) with both sides at the inner diameter side of the outer core 60" deleted so as for the lamination sheets 61" not to collide with each other while being vibrated.

It is preferred that the deleted portion (S) in the terminal part 77" is distanced from the lamination sheet 61" as far as by more than twice the thickness (t) of the lamination sheet 61".

Accordingly, the reciprocating motor in accordance with the third embodiment of the present invention, even though the lamination sheets 61" adjacent to the terminal part 77" are vibrated owing to the mutual repulsive force during operation of the motor, they would not collide with the terminal part 77" thanks to the deleted portion (S).

Figure 10:
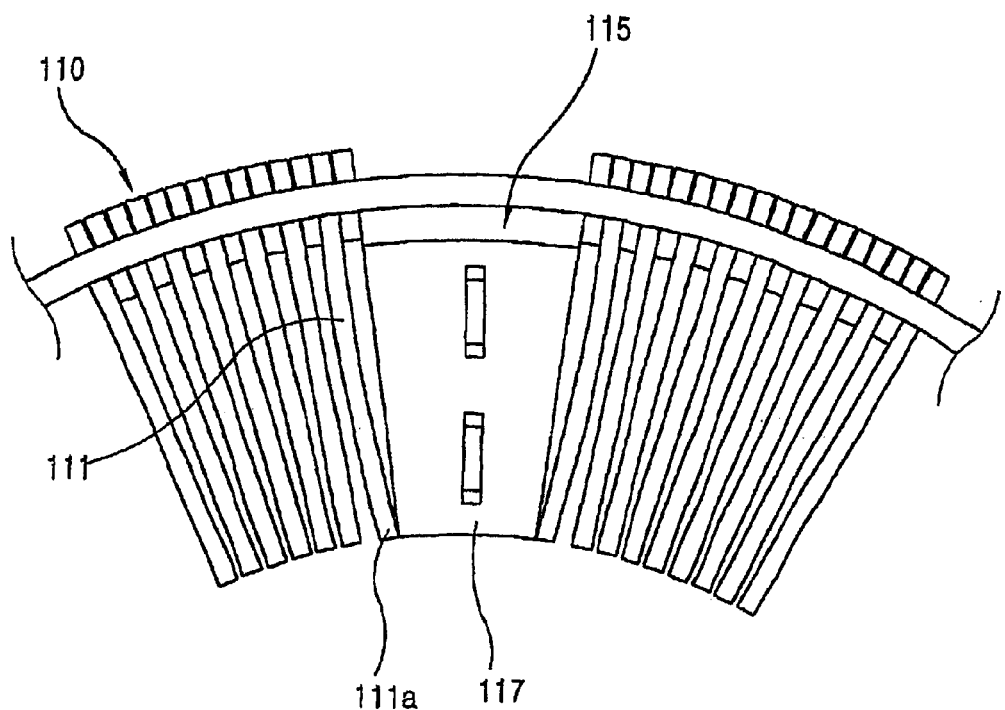
FIG. 10 is a detailed view of a major part of a reciprocating motor in accordance with a fourth embodiment of the present invention.

FIG. 10 is a detailed view of a major part of a reciprocating motor in accordance with a fourth embodiment of the present invention.

A reciprocating motor in accordance with the fourth embodiment of the present invention is feature in that a lamination sheet 111 adjacent to a terminal part 117 of a bobbin 115 is bent to be adhered to the terminal part 117.

That is, in a lamination sheet 111, an inner end portion 111a forming the inner diameter of an outer core 110 is bent to have an elasticity to be adhered to the terminal part 117, so that the inner end portion 111a of the lamination sheet 111 is put to a state of being constantly adhered to the side of the terminal part 117.

Accordingly, since the lamination sheet 111 adjacent to the terminal part 117 is elastically adhered to the terminal part 117, the lamination sheet 111 is prevented from colliding with the terminal part 117 during an operation of the motor.

Figure 11:
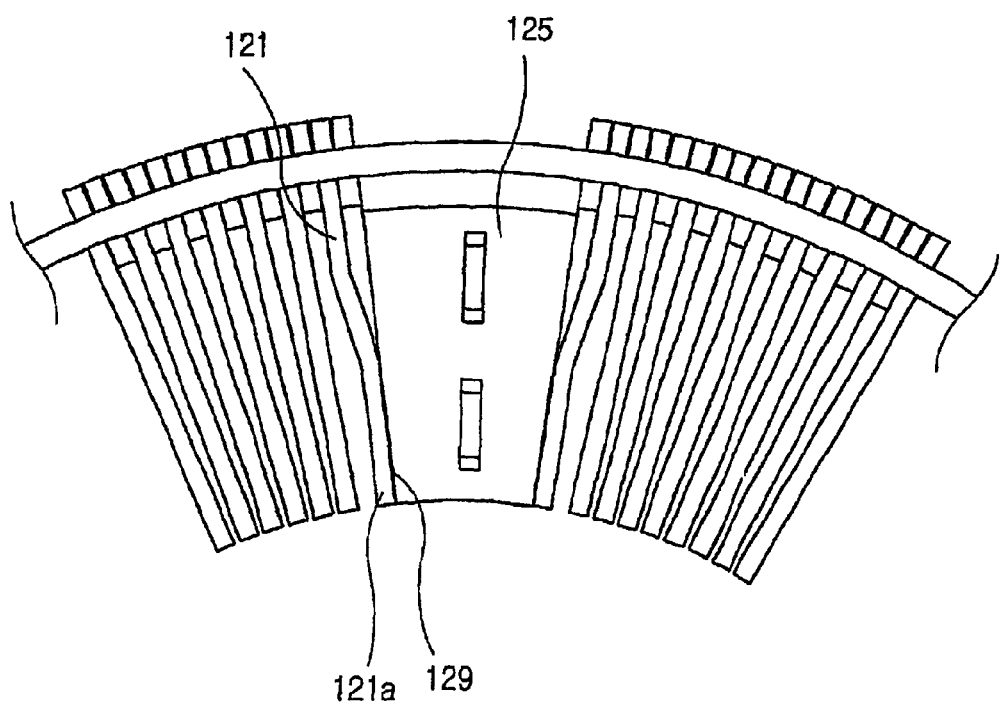
FIG. 11 is a detailed view of a major part of a reciprocating motor in accordance with a fifth embodiment of the present invention.

FIG. 11 is a detailed view of a major part of a reciprocating motor in accordance with a fifth embodiment of the present invention.

A reciprocating motor in accordance with a fifth embodiment of the present invention is featured in that, unlike the reciprocating motor in accordance with the fourth embodiment of the present invention, an inner end portion 121a of a lamination sheet 121 is completely attached to the terminal part 127 by using an adhesive 129.

Figure 12:
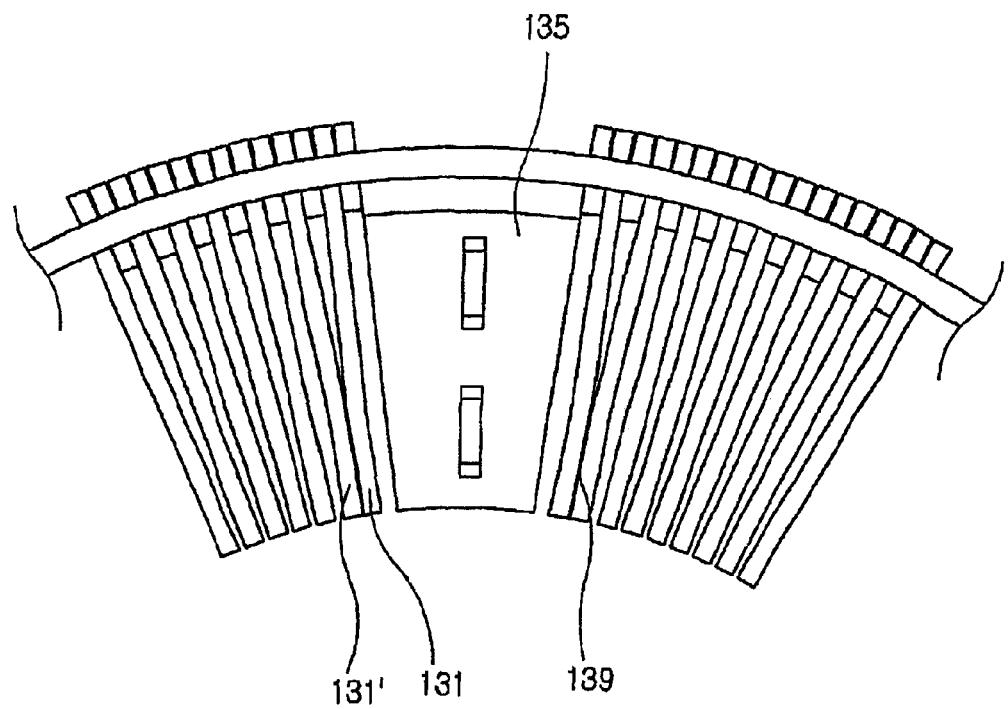
FIG. 12 is a detailed view of a major part of a reciprocating motor in accordance with a sixth embodiment of the present invention.

That is, in the fifth embodiment of the present invention, in a state that the middle portion of the lamination sheet 121 is somewhat bent, the side face at the side of the inner end portion 121a is attached to the side face of the terminal part 125 by using an adhesive 129, to have a completely fixed structure, and accordingly, the lamination sheet 121 and the terminal part 125 are prevented from colliding with each other during an operation of the motor FIG. 12 is a detailed view of a major part of a reciprocating motor in accordance with a sixth embodiment of the present invention.

A reciprocating motor in accordance with the sixth embodiment of the present invention is featured in that a lamination sheet 131 next to a terminal part 135 is attached to an adjacent lamination sheet 131' by using an adhesive 139.

Accordingly, when the reciprocating motor is operated, even though the lamination sheet 131 adjacent to the terminal part 135, since the lamination sheet 131 is attached to the lamination sheet 131', the lamination sheet 131 and the terminal part 135 are prevented from colliding with each other.

Figure 13:
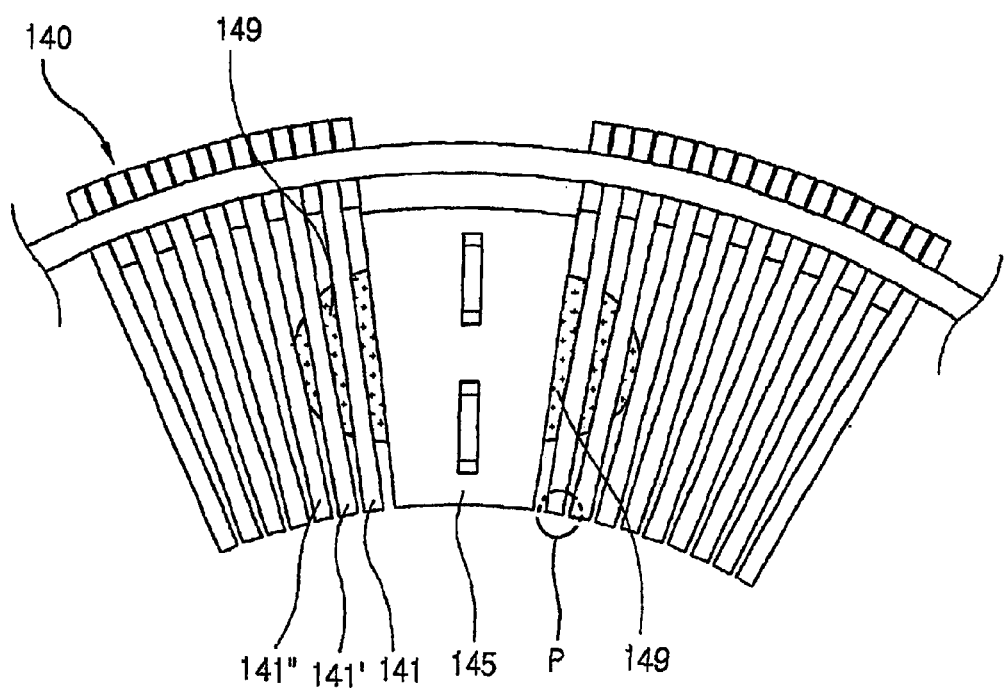
FIG. 13 is a detailed view of a major part of a reciprocating motor in accordance with a seventh embodiment of the present invention.

FIG. 13 is a detailed view of a major part of a reciprocating motor in accordance with a seventh embodiment of the present invention.

A reciprocating motor in accordance with a seventh embodiment of the present invention is featured in that a resin is injected between a lamination sheet 141 and a lamination sheet 141' or between the lamination sheet 141 and a terminal part 145, so that they can be mutually fixed by a hardened molding member 149.

In detail, the molding member 149 is filled between the lamination sheets 141 and the terminal part 145 in a melt state at the side of the outer core and hardened to a sold state, so that the lamination sheet 141 is prevented from colliding with the terminal part 145.

In this respect, when the molding member 149 is injected between the lamination sheet 141 and the terminal part 145, if the molding member 149 flows out to the inner diameter of the outer core 140 and is hardened, an interruption occurs with respect to an armature (not shown) during an operation of the motor. Thus, it is preferred that the molding member is filled only at the inner side except the pole portion (P), the inner end portion of the lamination sheet, and hardened.

Meanwhile, the reciprocating motor is typically used for a compressor of a freezing cycle. Thus, as the molding member 149, a member having a property of maintaining the hardening characteristic as it is is preferably selected for use according to a type of a coolant.

Figure 14:
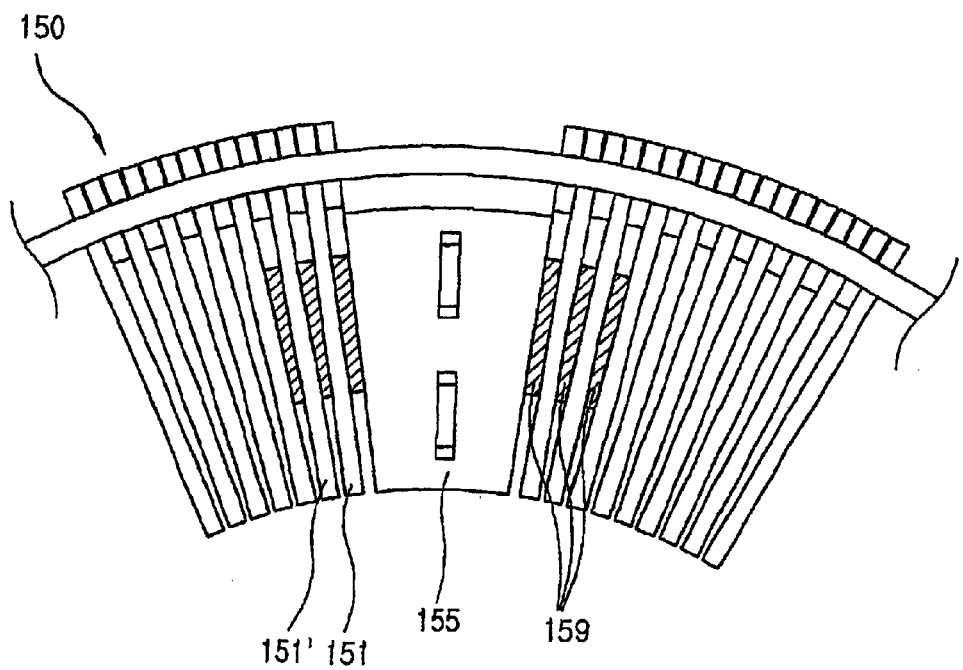
FIG. 14 is a detailed view of a major part of a reciprocating motor in accordance with a eighth embodiment of the present invention.

FIG. 14 is a detailed view of a major part of a reciprocating motor in accordance with a eighth embodiment of the present invention.

A reciprocating motor in accordance with the eighth embodiment of the present invention is featured in that a sheet-shaped insertion member is press-fit between a lamination sheet 151 and a lamination sheet 151' or between a terminal part 155 and the lamination sheet 151 at the side of the inner diameter of an outer core 150.

The insertion member 159 is formed thicker than an interval between the lamination sheet 151 and the lamination sheet 151' and an interval between the terminal part 155 and the lamination sheet 151, and combined by being firmly inserted between the two members.

Of course, the insertion member 159 may fixe the two member by using an adhesive.

Figure 15:
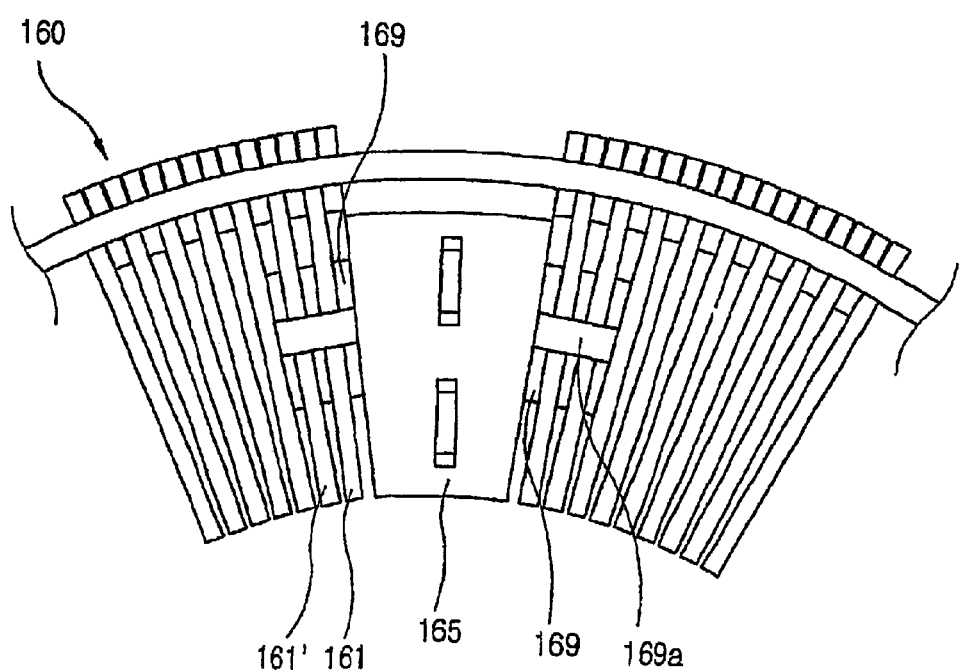
FIG. 15 is a detailed view of a major part of a reciprocating motor in accordance with a ninth embodiment of the present invention.

FIG. 15 is a detailed view of a major part of a reciprocating motor in accordance with a ninth embodiment of the present invention.

A reciprocating motor in accordance with a ninth embodiment of the present invention is featured in that a sheet-shaped rubber member is press-fit between a lamination sheet 161 and a lamination sheet 161' or between a terminal part 165 and the lamination sheet 161 at the side of an inner diameter of an outer core 160.

Similar to the insertion member of the eighth embodiment of the present invention, the rubber member 169 is made of a rubber material having an elasticity, and especially, it is preferred that portions inserted between the two members are integrally formed by being mutually connected by a connection portion 169a.

Accordingly, as for the reciprocating motor in accordance with the ninth embodiment of the present invention, since the rubber member 169 is inserted between the terminal part 165 and the lamination sheet 161 adjacent to the terminal part 165, the lamination sheet 161 is prevented from colliding with the terminal part 165 during an operation of the motor, so that a noise generation can be reduced during the operation of the motor.

Figure 16:
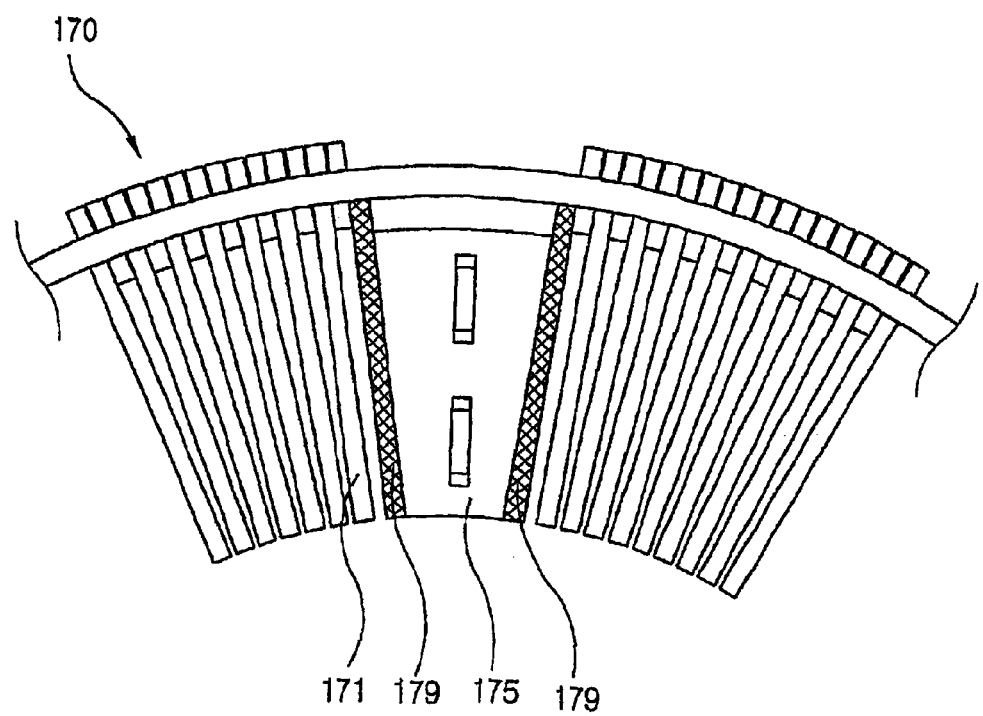
FIG. 16 is a detailed view of a major part of a reciprocating motor in accordance with a tenth embodiment of the present invention.

FIG. 16 is a detailed view of a major part of a reciprocating motor in accordance with a tenth embodiment of the present invention.

A reciprocating motor in accordance with the tenth embodiment of the present invention is feature in that a conductor member 179 is installed at both sides of a terminal part 175 of a bobbin to create a repulsive force with respect to a lamination sheet 171.

The conductor member 179 is formed as a thin plate having an area equivalent to the area of the lamination sheet 171 and attached to the side of the terminal part 175.

Accordingly, in the reciprocating motor in accordance with the tenth embodiment of the present invention, since a flux is formed even at the conductor attached to both sides of the terminal part 175 as well as at the lamination sheet 171 as the motor is operated, a pushing force works between the conductor member 179 and the lamination sheet 171. Accordingly, the lamination sheet 171 adjacent to the terminal part 175 is prevented from being vibrated, so that collision between the terminal part 175 and the lamination sheet 171 is prevented.

Figure 17:
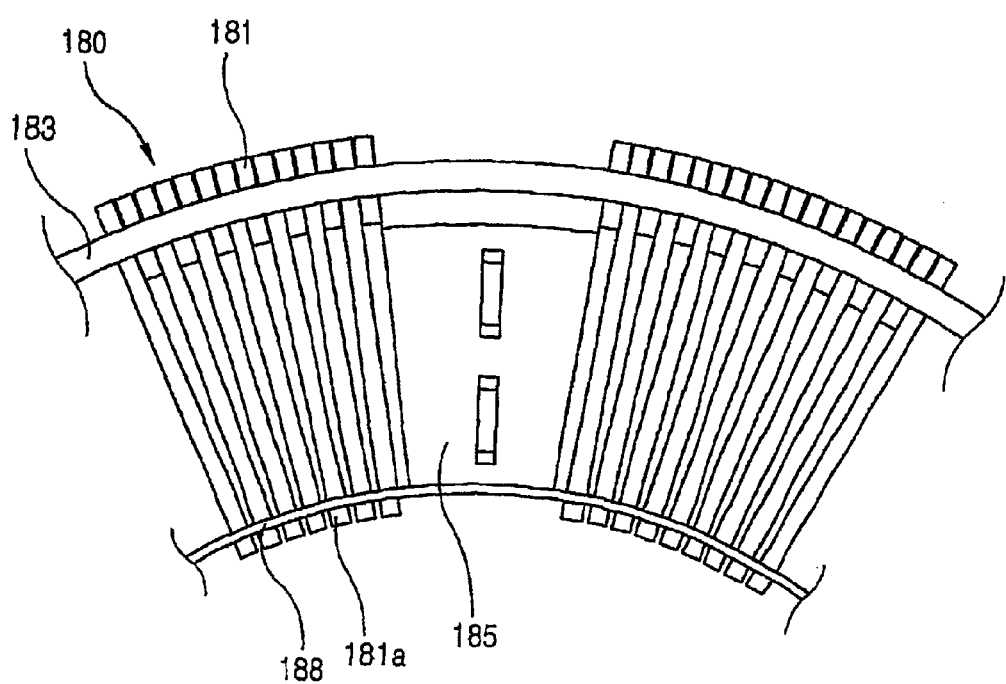
FIG. 17 is a detailed view of a major part of a reciprocating motor in accordance with a eleventh embodiment of the present invention.

FIG. 17 is a detailed view of a major part of a reciprocating motor in accordance with an eleventh embodiment of the present invention.

A reciprocating motor in accordance with an eleventh embodiment of the present invention is featured in that lamination sheets 181 are fixed by an inner diameter fixing ring 183 and an outer diameter fixing ring 188 of the outer core 180.

That is, the fixing ring 183 is installed at the outer diameter to fix the lamination sheets 181 stacked in a cylindrical form, and a groove 181a is formed at the side of the inner diameter of the lamination sheet 181, in which the fixing ring 188 is inserted to be connected, so that the lamination sheets 181 are mutually fixed.

Accordingly, in the reciprocating motor in accordance with the eleventh embodiment of the present invention, since the lamination sheet 181 adjacent to the terminal part 185 is prevented from vibrating thanks to the fixing ring 183 installed at the side of the inner diameter of the outer core 180, a collision between the lamination sheet 181 and the terminal part 185 is prevented and a noise generation can be minimized.

INDUSTRIAL APPLICABILITY

As so far described, as for the reciprocating motor in accordance with the present invention, since a part or the whole of the plurality of lamination sheets constituting the outer core are mutually fixed, a collision between the terminal part and the lamination sheet adjacent to the terminal part is prevented during an operation of the motor. Thus, components is prevented from damaging due to a possible collision between the two members and the collision noise can be reduced, so that a reliability of the motor can be heightened.

What is claimed is:

1. A reciprocating motor comprising:
   a bobbin in which a coil is wound;
   a terminal part formed at a first side of the bobbin to electrically connect the coil and an external circuit;
   a plurality of lamination sheets radially stacked in a circumferential direction centering around the bobbin;
   a collision preventing part formed between the terminal part and a lamination sheet adjacent to the terminal part for preventing a collision between the terminal part and the adjacent lamination sheet, wherein the collision preventing part is formed such that the lamination sheet adjacent to the terminal cart is bent, and contacts the side of the terminal part.

2. A reciprocating motor comprising:

a bobbin in which a coil is wound;

a terminal part formed at a first side of the bobbin to electrically connect the coil and an external circuit;

a plurality of lamination sheets radially stacked in a circumferential direction centering around the bobbin; and a collision preventing part formed between the terminal part and a lamination sheet adjacent to the terminal part for preventing a collision between the terminal cart and the adjacent lamination sheet, wherein the collision preventing part is an insertion member press-fit between the terminal part and the lamination sheet adjacent to the terminal part.

3. A reciprocating motor comprising:

a bobbin in which a coil is wound;

a terminal part formed at a first side of the bobbin to electrically connect the coil and an external circuit;

a plurality of lamination sheets radially stacked in a circumferential direction centering around the bobbin; and a collision preventing part formed between the terminal part and a lamination sheet adjacent to the terminal part for preventing a collision between the terminal part and the adjacent lamination sheet, wherein the collision preventing part is a conductor member installed at the terminal part to apply a repulsive force with respect to the lamination sheet adjacent to the terminal part.

4. The reciprocating motor of claim 3, wherein the conductor member is formed as a thin plate having an area equivalent to that of the lamination sheet.

\* \* \* \* \*